United States Patent
Katz

Patent Number: 6,114,825
Date of Patent: Sep. 5, 2000

[54] METHOD AND APPARATUS FOR STATE PATH GENERATION IN A CONTROLLED SYSTEM

[75] Inventor: Stanley M. Katz, Stoughton, Mass.

[73] Assignee: Control Technology Corporation, Hopkinton, Mass.

[21] Appl. No.: 09/418,261

[22] Filed: Oct. 14, 1999

Related U.S. Application Data

[60] Provisional application No. 60/108,944, Nov. 18, 1998.

[51] Int. Cl.[7] ........................................ G05B 5/01
[52] U.S. Cl. .................. 318/615; 318/609; 318/610; 318/561; 318/573; 318/569; 318/568
[58] Field of Search ....................... 318/615, 609, 318/610, 561, 573, 569, 568; 364/474.27

[56] References Cited

U.S. PATENT DOCUMENTS

| | | | |
|---|---|---|---|
| 4,769,583 | 9/1988 | Goor | 318/568 |
| 5,740,058 | 4/1998 | Dirkx et al. | 318/600 |
| 5,770,829 | 6/1998 | Katz et al. | 318/560 |
| 5,929,855 | 7/1999 | Benton et al. | 345/349 |
| 5,953,226 | 9/1999 | Mellish et al. | 364/147 |
| 5,961,563 | 10/1999 | Overton | 318/600 |
| 5,963,450 | 10/1999 | Dew | 364/474.11 |
| 6,002,231 | 12/1999 | Dirkx et al. | 318/609 |

*Primary Examiner*—Karen Masih
*Attorney, Agent, or Firm*—Cesari and McKenna, LLP

[57] ABSTRACT

Control of time-dependent states, such motion, is facilitated in a manner that avoids explicit solution to the governing equations, but which permits specification of both an initial and a final acceleration. This permits the operator to restrict jerk by exerting control over the final acceleration (e.g., by setting this equal to the initial acceleration, or constraining it to within an allowed maximum), but without explicitly computing parameter values for jerk. More generally, the approach is useful in controlling any system in which states evolve with respect to a specific parameter (frequently, but not necessarily, time), and whose evolution can be described by a defined set of algebraic equations.

12 Claims, 2 Drawing Sheets ns from U.S. Provisional appli-
METHOD AND APPARATUS FOR STATE PATH GENERATION IN A CONTROLLED SYSTEM

RELATED APPLICATION

The present invention stems from U.S. Provisional application Ser. No. 60/108,944, filed on Nov. 18, 1998.

FIELD OF THE INVENTION

The present invention relates to industrial automation, and in particular to control and monitoring industrial processes and equipment.

BACKGROUND OF THE INVENTION

Control of industrial machinery and processes frequently requires achieving various states at precise times. For example, in an industrial robot, it may be necessary to move an armature from a standby position to a ready position within a specified interval. A motion-control system, such as a servomotor, can be used to execute time-dependent movements by, for example, controlling an armature according to user-defined constraints.

In sophisticated applications, the parameters governing the final state may be complex. It may be necessary to specify not only the final position of the armature at a time t, for example, but also its velocity and even acceleration at that position. Suppose a programmable controller is used to control the motion of a label applicator, which affixes labels to cartons moving along a conveyor belt. The applicator must not only move the label into a position directly adjacent a carton as it passes, but must also be moving at the speed of the carton at this point. The controller must therefore be capable of generating motion that will achieve target positions and velocities at specified times, which may themselves change if the cartons move at a non-uniform rate. Similar time-dependent state control may also occur in industrial processes. For example, a thermostat may be configured to attain target temperatures in a process tank, which is heated by a burner whose intensity can be controlled. The temperature responsiveness of the tank may be modeled as a function of time, the intensity of the applied heat and the initial temperature, and the burner controlled in accordance with this model to bring the tank to various target temperatures at specified times.

For simplicity of presentation, the following discussion is directed toward motion control, since these systems are so common and well-characterized in terms of state control. A conventional motion-control system may utilize a dedicated component or software module to govern servomotor operation. Called a "profile generator," this component operates as part of or in concert with a programmable controller that supervises the operation of the machinery of which the servomotor is a part. The profile generator, in turn, sends signals to a "position controller" that sends control signals to the motor, which is equipped to respond to those signals (either directly or by means of a motor driver).

It is important, in understanding the function of the profile generator, to distinguish its role from those of the supervisory controller and the position controller. The supervisory controller may specify various target states of the motor's armature and the times at which these states are to occur. A "state" refers to the values of a set of parameters relevant to the controlled operation—i.e., motion. These parameters may include, for example, an absolute position, velocity, and acceleration; for the state to be attained, the motion of the armature must conform, generally at a predetermined time (which represents one of the parameters of the target state), to all parameter values specified in the state. The supervisory controller defines overall start and end states for the motion, and ordinarily will decompose that motion into a "trajectory," or series of contiguous paths. Each path is a series of states and is defined by its own start and end states and the way the system changes from the start to the end state. The end state of any path (other than the last) is also the start state of the next path. These states are fully determined in terms of all relevant variables, and represent "control points" (or "waypoints") that collectively define the path. Each waypoint represents the final state of one path and the initial state of the next path.

The profile generator establishes a more detailed series of paths through which the armature travels in order to traverse the paths specified by the supervisory controller, and to satisfy the requirements for the specified states at the predetermined times. This may include defining additional waypoints within the paths defined by the supervisory controller. Accordingly, the motion is not merely the directional route followed by the armature, but a sequence of states (which include the specified states).

The concept of state paths is a general one not confined to the domain of motion control. As understood in the art, a state path is a train of states (which may be defined continuously or discretely, in terms of control points) that describes how the system changes from the initial state to the final state. The path extends through the space of all possible system states, where the space is defined by a series of axes or dimensions each corresponding to a parameter relevant to system operation; each individual state is then a set of values for each parameter. These parameters may be measured directly or computed from other, measured parameters.

A simple controller may explicitly control only a single parameter. For example, servo controllers are usually either position controllers or velocity controllers in that the controller itself can keep only the actual position or the actual velocity equal to a commanded value. A position controller, however, can achieve some control of the velocity by having the profile generator change the desired position at a rate corresponding to the desired velocity. Similarly, varying the desired velocity allows the acceleration to be specified. More advanced controllers are of course possible. For example, the state-space concept may control multiple parameters of a state simultaneously (as in so-called multi-variable controllers). The profile generator does not control the state of the system along the calculated path; this function is performed by the position controller in a motion control system. The profile generator also does not itself perform control functions (i.e., autonomously alter the path in response to changing system conditions); these are carried out by the supervisory controller. Although the profile generator may compute a new path in response to a command from the supervisory controller, it does not exert control over the operated system. Instead, it translates the general motion requirements of the supervisory controller into a detailed sequence of desired positions for the position controller.

Thus, in a typical motion-control system, the supervisory controller determines one or more target states of the motor's armature at given times based on its operation of the overall machinery, or in response to external (e.g., operator-provided) signals, and issues a command to the profile generator specifying the target state (which may include the time); in other words, the supervisory controller sets the profile parameters (i.e., the sequence of trajectories) and initiates motion. The profile controller computes the armature movements—that is, the path—necessary to achieve the desired states and issues, to the position controller, commands invoking these movements. In general, the path is defined in terms of a series of control points that include the states specified by the supervisory controller. The position controller, responding to these commands, controls the motor. For example, in a servomotor system, the position controller dictates the current applied to the motor, and hence its torque; whereas in a stepper motor system, the position controller issues pulses, the frequency of which determines the overall rate at which the rotor turns.

The system may also include a position-feedback unit that determines the actual state of the armature in order to ensure that the actual armature position corresponds to the position commanded by the position controller. In simple systems this position feedback is not made available to the profile generator. In such "open-loop" systems, the profile generator remains uninformed of the actual responses of the motor, assuming that the desired state is reached at each cycle (i.e., that the position controller successfully accounts for variation in the performance of the motor); in other words, the state at the beginning of a new cycle is taken as the commanded state from the previous cycle. In "closed-loop" systems, by contrast, the profile generator receives feedback information at the end of each cycle, using the actual measured position of the armature in computing motion for the next cycle.

The supervisory and position controllers of the system may also be configured in an open-loop (i.e., having no position-feedback element) or closed-loop (equipped with position feedback) configuration, regardless of the configuration of the other elements, subject to physical limitations (e.g., a servo controller cannot be open loop). Where more than one of the supervisory controller, the position controller and the profile generator are closed-loop systems, the same position-feedback element may be common to multiple subsystems; alternatively, the different modules may have separate position-feedback elements.

As noted above, the supervisory controller typically divides a motion profile into trajectories and, more finely, paths. The profile generator typically divides paths into "cycles" i.e., segments of a path. Complex motions are achieved through smooth catenation of different paths and segments into a single motion trajectory; smoothness is ensured by maintaining sufficiently small time lags between segments (a typical cycle time is 0.5 msec) and by the mechanical inertia of the system, thereby ensuring that the changes in parameters between cycles are not large. Breaking a desired motion into segments also allows for correction of errors before they become large, and also for real-time modification of the path of motion. A motion may therefore be defined by a sequence of specific states or control points, each achieved by successive cycles, or by a mathematical relationship relevant to the operation of the controlled machine. Even in the latter case, control points are typically defined in order to establish waypoints and smaller paths and to permit corrections to be made throughout the course of the motion.

Conventional profile generators may operate by solving the equations of motion applicable to the controlled motor for each path. For example, if acceleration is restricted to a linear function of time (a so-called linear motion profile), three equations specify acceleration, velocity, and position as first-, second-, and third-order functions of time, respectively. Solving these equations explicitly provides a mathematical model of motion, which can be used to specify the linear acceleration profile needed to take an initial position and velocity (at the beginning of the path) to a target position and velocity (at the end of the path).

There are several problems with this approach. First, the general equations must be solved in order to determine coefficient values for the actual motion equations. This must be accomplished whenever the target state changes or when the system determines That the current actual state is too far from the desired state. Moreover, evaluating the system of three equations at each cycle requires substantial computational power given the short allowable time between cycles. This difficulty can be ameliorated in accordance with U.S. Pat. No. 5,770,829, which utilizes information about the current state and the target state to reduce the computation necessary to obtain the initial acceleration. In particular, it is unnecessary to compute the coefficients of the three equations of motion. Moreover, because acceleration is assumed to be a linear function of time, specifying the initial acceleration and the rate of change of acceleration is sufficient to obtain a target velocity and position.

The utility of this approach breaks down, however, when the acceleration is non-linear, or when higher-order terms must be considered. For example, in many applications, it is necessary to specify (or at least minimize) "jerk"—i.e., the rate of change of acceleration with time, or $$\frac{d^4 P}{d t^4}$$

(where P is position). Indeed, merely specifying a linear acceleration in order to achieve a target velocity can actually ensure the occurrence of jerk at the target position if the speed is to remain constant for the succeeding path. An initial acceleration changes linearly with time until the target state is reached, after which it falls immediately to zero—thereby imparting substantial jerk to the system at the end of the path. If, alternatively, the path is defined in such a way that the final acceleration is zero (which will usually require additional computation by the supervisory controller), then the acceleration must be nonzero at the start of the path and jerk will be introduced at that time.

The process of evaluating a set of equations for the motion at each cycle also poses problems when the target state of the path is changed. For example, the target may shift in response to some change in the external system (e.g., if the box to be labeled slips on the conveyor, or is misplaced) or simply because the target is determined dynamically by some inputs to the system. Change of the target state requires recalculation of the parameters for the equations using the new end state and, in general, a new initial state before the equations themselves can be evaluated. Accordingly, not only must the equations be evaluated every cycle; it is also necessary, when the target is changing, to periodically recalculate the parameters for the equations. Once again, for the restricted case where the acceleration is linear, these recalculations may be avoided when using the techniques described in the No. '829 patent.

It is also necessary, in the case of a changing target, for the system (either the supervisory controller or the profile generator) to monitor the system input parameters that define the target and identify when they have changed sufficiently to require recalculation of the motion parameters. This is a non-trivial problem to solve for the general case, and may pose particular computational demands to ensure timely responses to changes in the target.

Still further problems may be caused practical limitations on the accuracy of mathematical representations and calculations, which are restricted by the limited time for computation and the limited resolution of digital representations of numerical values. These create inaccuracies both in the determination of the parameters for the equations of motion and during the evaluation of these equations. Since the equations themselves are dependent on time, which is always increasing, the magnitude of these errors will also increase with time. Accordingly, it becomes necessary to periodically check for excessive errors (in itself not a trivial task), further increasing the computational burden on the system.

Finally, in open-loop systems or in cases where the quality of position control is compromised by exceeding system capabilities (e.g., requiring a torque larger than the system can provide), problems may be encountered when the actual position is no longer close to the required position. In particular, this condition may cause additional jerk when changing between paths.

DESCRIPTION OF THE INVENTION

Brief Summary of the Invention

In a first aspect, the present invention provides for fuller control of motion in a manner that avoids determining an explicit solution to the governing equations, but which permits specification of both an initial and a final acceleration. As a general matter, this approach affords a greater range of motion control without additional computational demands. More specifically, it permits the operator to restrict jerk by exerting control over the final acceleration (e.g., by setting this equal to the initial acceleration of the following segment, or constraining it to within an allowed maximum), but without explicitly computing parameter values for jerk.

In accordance with this aspect of the invention, the required initial acceleration $A_i$ achieve a desired target state that includes a specified final acceleration $A_f$ is given by $$A_i = \frac{12P_f - 6t(V_i + V_f)}{t^2} + A_f,$$

where $P_f$ is the specified final position (relative to the initial position), $V_i$ is a specified initial velocity, $V_f$ is the specified final velocity, and t is time. Because the equation depends only on known elements of the initial state at the start of each cycle and the desired target state, there is no accumulated error over a series of cycles. This is in contrast to systems that compute motion parameters not from the actual state of the system at the beginning of the cycle, but from some earlier point (e.g., the start of the motion segment). For example, in simple open-loop systems, actual motion parameters are known only at the start of motion segment, but new target parameters are computed at each cycle (i.e., for successive points along the path of motion). Where it is necessary to alter the path of motion in real time, or where the system fails to follow the predetermined path, the parameter values employed at each cycle for purposes of computing target values for the next cycle will be incorrect, and the error will cumulate over successive cycles.

In addition, for any numerical system, it is necessary to balance the speed of computation with the accuracy with which numbers are represented. All representations may contain inherent inaccuracies (i.e., there are some numbers that cannot be perfectly specified in that representation), and performing mathematical operations may decrease accuracy still further. An example of this is calculating the difference between two numbers that are very close in value; even if the numbers are accurate to 1 part in 1000, if the difference between them is only $100^{th}$ of their value, the result can only be accurate to 1 part in 10. Unless care is taken these inaccuracies may become substantial, especially in cases where the numbers are used to repeatedly perform a calculation using previous results to determine new values. Since the present invention, implemented in a closed-loop configuration, uses only the measured current data and the desired final data, this accumulation of error due to representational inaccuracies is avoided.

In a second aspect, the invention facilitates specification of higher-order terms. Some applications, for example, may require the application of jerk; e.g., if a motor is capable of non-linear accelerational movement, its range of capabilities can be substantially enhanced. But again, specifying a target jerk can result in abrupt transition in the higher-order term $$\left(\text{i.e., ``impulse,'' or } \frac{d^5 P}{dt^5}\right)$$

when the target state is reached. In accordance with the present invention, initial and target values of jerk are specified in advance without the need for express computation of impulse.

More generally, the invention is applicable to any system operation involving states that evolve with respect to an uncontrolled varying parameter (frequently, but not necessarily, time), and whose evolution can be described by successively higher-order algebraic equations.

BRIEF DESCRIPTION OF THE DRAWINGS

The foregoing discussion will be understood more readily from the following detailed description of the invention, when taken in conjunction with the accompanying drawings, in which.

GLOSSARY OF TERMS

Figure 1:
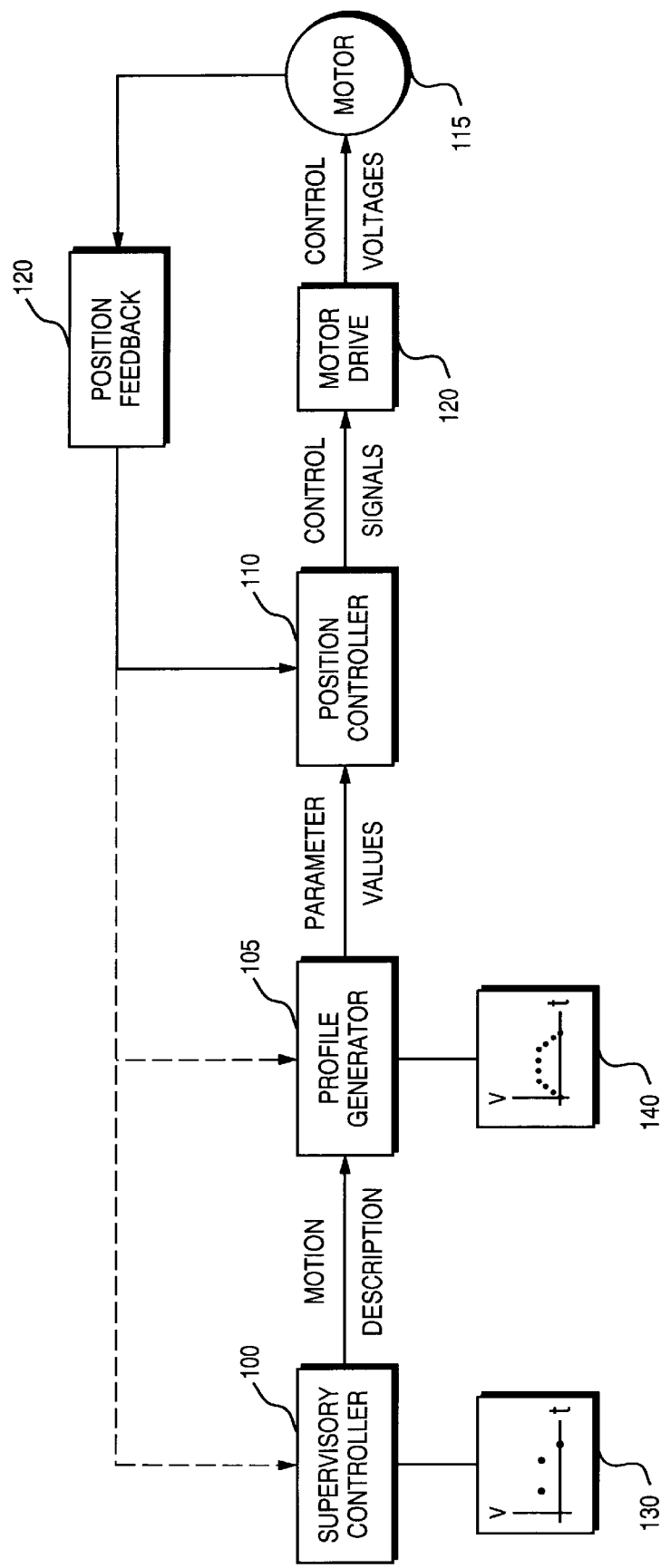
FIG. 1 schematically depicts a control system embodying the principles of the present invention.

The following definitions apply to various terms used herein:

"Parameter" means a single value that may be measured or calculated, and which describes one aspect of the system. Representative parameters include position, velocity, temperature, and time.

"State" means a set of parameters that are sufficient to define the system. Not all parameters of a system need be defined in the state, only those that are of interest. An "Actual State" is measured or based on measured parameters, whereas a "Desired State" is determined by external requirements. For many systems time is one of the parameters of a state.

"System Characteristic Equation" refers to a description, usually mathematical, of the relationship between the parameters of a system. When it is known, this equation may be used to predict the behavior of a system or to determine the value of parameters that cannot be measured from parameters that can be measured.

A "Path" is a series of states that describe how a system changes from an "Initial State" to a "Final State." The intermediate states in a path may be explicitly listed or may be defined by a set of mathematical relationships (usually dependent on the initial and final states).

A "Trajectory" is a series of paths, and may be generated by a supervisory controller based on external requirements and provided as an input to a profile generator.

A "Profile" refers to a series of states or trajectories (or a combination thereof) that are provided as input to the supervisory controller, and which will be used to generate the trajectory. In general, a profile is not completely specified but only defines critical states and trajectories.

A "Waypoint" is a state within a trajectory that represents the final state of one path and the initial state of the next path.

"Controller" means a device that is designed to adjust one or more system parameters (i.e., inputs) so as to minimize the difference between the desired and actual values of one or more other system parameters. In general, the controller should be able to adjust as many parameters as it is designed to control. Most controllers are "single input, single output" and thus only control a single parameter. However, multi-variable controllers that control several parameters simultaneously also exist. The controller is usually described by the mathematical basis of its design, e.g., a PID (Proportional-Integral-Derivative) or a state-space controller.

Many control systems are implemented using digital control systems that perform the required calculations at periodic (time-based) intervals. Each set of calculations is called a "cycle" and the time between successive calculations is the "cycle time." A control system may have multiple cycles executing at different rates.

"Segment" means the change in state (either a desired state or an actual state) that occurs between cycles, i.e., in a period equal to the cycle time.

"Profile Generator" refers to the component of a control system that provides the desired values of the parameter to be controlled. In the simplest case, the profile generator may be a knob that adjusts the parameter. For purposes hereof, it is assumed that the value will be changing.

DETAILED DESCRIPTION OF THE PREFERRED EMBODIMENTS

Refer first to FIG. 1, which illustrates generally a hardware architecture for a system embodying the invention in the exemplary domain of motion control. A supervisory controller 100 determines the desired motion of a motor armature, providing a description of the motion to a profile generator 105. The profile generator may be physically integrated within controller 100, either as a dedicated hardware unit or in implemented software. Profile generator 105 computes parameters for achieving the desired motion, and sends signals representing these to a position controller 110, which controls torque in a motor 115 (the component that actually carries out the motion) by means of a motor drive 120. The control signals generated by position controller 110 depend on the actual evolving state of motor 115, which may be provided by a position feedback subsystem 120 connected to the controller 110. In a closed-loop configuration, subsystem 120 also provides position information to profile generator 105 and, if desired, to controller 100 as well. It should be stressed, however, that the various feedback connections are determined independently; for example, operating profile generator 105 in a closed-loop mode does not mandate similar operation of controller 100. Indeed, where controller 100 operates in an open-loop mode, there may be distinct advantages in operating profile generator 105 in a closed-loop mode.

Supervisory controller 100 is configured to govern the operation of the overall machine, of which motor 115 is a part, in accordance with a stored control program. When executed, the program causes controller 100 to examine the state of the controlled machinery by evaluating signals from one or more sensing devices (e.g., switches, pushbuttons, temperature or pressure sensors), and to operate the machinery based on a logical framework, the sensor signals and, if necessary, more complex processing. The present discussion is concerned solely with operation of motor 115, however, and controller 100 accomplishes this by periodically specifying a desired (end) state of the armature in terms of a target position, velocity, and acceleration, and generally a specified time within which the target state is to be reached. As indicated in the representation 130, controller 100 may define a desired motion in terms of just a few states; shown representatively in the figure are four time-specified values for velocity, which represents one of several axes (the others including position and acceleration) defining the state space.

This motion description is provided to a profile generator 110, which is configured to operate in accordance with the principles of the present invention. As shown in the representation 140 (which is once again, for illustrative purposes, confined to the single parameter velocity), profile generator 110 generates a series of intermediate control points, each corresponding to a motion segment to be completed within a single cycle, that encompass the controller-specified states and ensure a smooth motion. Typically, the cycle time is about 0.5 msec, and in most cases will not exceed 5 msec. At the beginning of each cycle, profile generator 100 computes motion parameter values for achieving the next control point.

In an open-loop profile-generator configuration, parameter values for the new cycle are based on the prior target state—i.e., on the assumption that the prior target state was attained. In a closed-loop profile-generator configuration, the next target state is based on actual position information provided by feedback subsystem 120, which avoids accumulation of error. Breaking a desired motion into single-cycle segments allows for rapid reaction to changes in the desired motion, caused, for example, by external changes or unexpected conditions affecting the operation of the overall machine; because parameters for each segment are computed on an individual basis, it is unnecessary to recompute parameters for all cycles each time the desired motion changes.

Based on the current (i.e., assumed or measured) position, velocity, and acceleration (if any), as well as the allowed time within which the target state must be achieved, profile generator 105 computes the acceleration profile needed to obtain a target position, velocity, and acceleration based on the time within which these parameters are to be attained. The computed acceleration profile is passed to position controller 110, which causes the armature of motor 115 to undergo this acceleration; in controlling the torque of motor 115, motor drive 120 is responsive to the current acceleration (if any) of motor 115. With the target state attained (or, in an open-loop system, assumed to have been attained), the cycle is complete, and profile generator 105 computes parameter values for the next cycle.

Preferably, acceleration is modeled as a second-order function of time, and the required initial acceleration $A_i$ to achieve a desired target state that includes a specified final acceleration $A_f$ is given by $$A_i = \frac{12P_f - 6t(V_i + V_f)}{t^2} + A_f,$$

where $P_f$ is the specified final position (relative to the initial position), $V_i$ is a specified initial velocity, $V_f$ is the specified final velocity, and t is time. By affording the ability to specify a final acceleration, the present invention allows for control of jerk (which is modeled as a linear function of time). For example, the absence of jerk can be ensured by setting $A_f$ to zero (or to the desired initial acceleration for the next segment of motion). However, it must be recognized that specifying jerk is accomplished only indirectly; the present invention facilitates control of acceleration without explicit computation or monitoring of jerk. This is in contrast to prior-art systems, in which computation of a given term required calculations involving a higher-order term; see, e.g., the No. '829 patent mentioned above.

It should be noted that t need not connote time, but may instead designate a time-related parameter (e.g., the position of a constantly moving conveyor that carries boxes to be labeled, since in such a case, time and position are directly correlated). It should also be noted that the specific equation to calculate acceleration mentioned above $$\left( A_i = \frac{12P_f - 6t(V_i + V_f)}{t^2} + A_f \right)$$

is a result of the fact that the motion parameters position, velocity and acceleration are related as simple mathematical derivatives of time. Using the present technique on a more complex physical system will involve a different equation.

Figure 2:
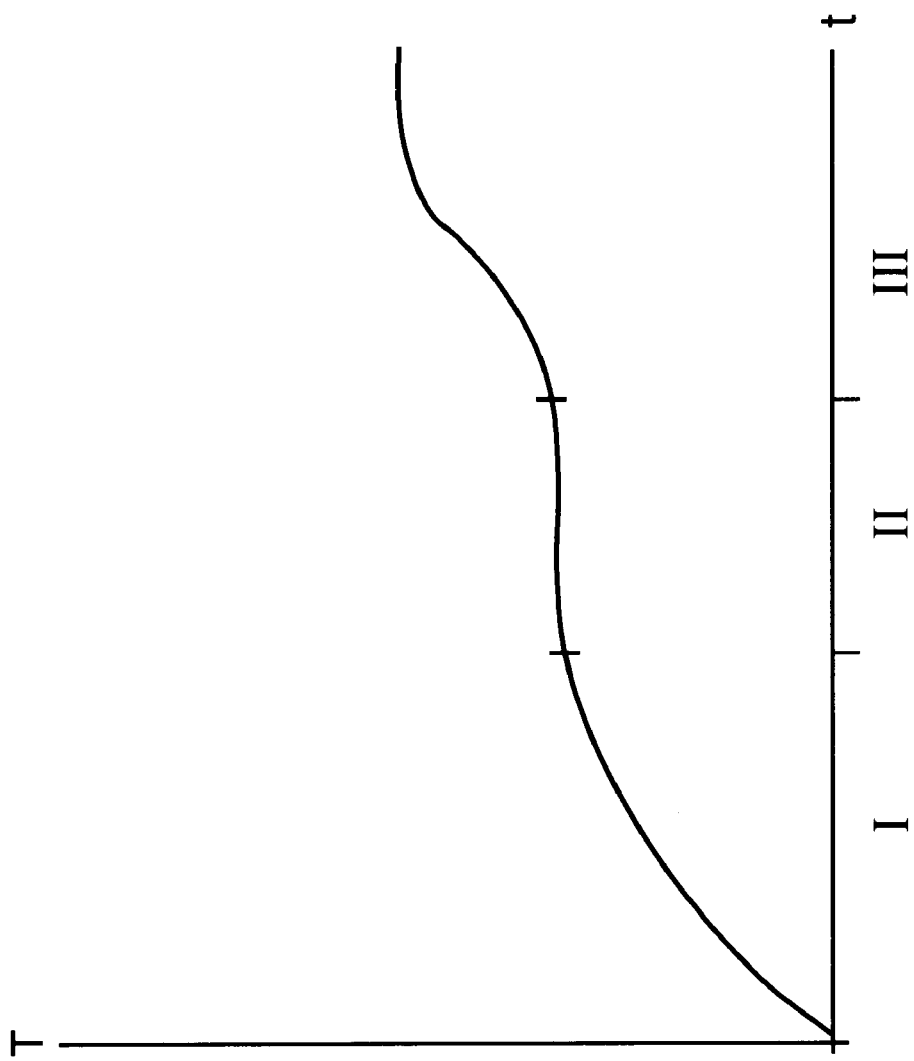
FIG. 2 graphically illustrates a temperature profile for a representative chemical reaction amenable to control in accordance with the invention.

Another exemplary environment amenable to control in accordance with the invention is illustrated in FIG. 2, which shows a temperature profile for a chemical process (such as brewing, or combining two reactants) that generates or requires heat. The first stage of the reaction, corresponding to the initial rise of the curve and depicted in segment I, takes the reactants to the proper reaction temperature, which is maintained during processing (segment II). During segment I, limitations exist on the rate at which the reaction vessel can be cooled (if the reaction generates heat) or heated (if the reaction requires heat).

There are generally at least two reasons to limit the cooling (or heating) rate. First, there is a limit to how cold the refrigerant is (or how hot the heaters can become). This limit determines the rate of heat transfer, usually in a very non-linear manner that depends on the actual vessel temperature. In addition, there is often some time needed for the temperature to equalize across the vessel. This can be reduced by stirring, etc., but will never be zero. The material closest to the cooling (or heating) coils should not be allowed to freeze (or boil), in the extreme case, while the material further away is not yet at the correct temperature.

It is generally also desirable for the rate of heating or cooling (i.e., the second time derivative of temperature) to be zero at the end of segment I. This is because the temperature-control coils themselves (and the liquid in them if they are cooling coils) take some time to change temperature. If the temperature-control system is still affecting the temperature at the end of segment I, the temperature is the vessel will continue changing for some time after the target temperature is reached and will not be stable during the critical middle portion of the process.

Segment II, the period of constant temperature, represents the time during which the reaction or processing occurs. It is the most important time for the actual production and requires good control, although it also represents the simplest part of the cycle in terms of path generation.

The last stage, corresponding to the second rise of the curve in segment III. represents the end the chemical process. It involves either heating or cooling (or possibly a sequence of both) of the vessel to stop the reaction and to prepare the product to be processed further. As in the initial stage, there may be additional limits on the rate of change of temperature. Generally, a stable temperature at the end is desirable, as is rate of temperature change at the end close to zero. Ideally, the rise time to the final stable temperature is as short as possible since in order to prevent formation of unwanted byproducts resulting from incorrect temperatures.

These requirements furnish the basis for defining a path, as discussed above, through the state space of time, temperature and its time derivatives. The cooling or heating coils are analogous to the motor in the motion-control example above, with energy being supplied to alter the rate of heating or cooling (which itself is not a linear function of supplied energy, but is instead highly dependent on the nature of the reactants and the current temperature at any point). Ordinarily, the path is implemented by control system analogous to that described above, but which is configured to operate the heating or cooling apparatus. In this case, temperature feedback may be used to enable the controller to utilize system responsiveness in determining the energy applied to the heating or cooling apparatus.

More generally, the principles of the present invention are applicable to any system operation involving states that evolve with respect to a specific parameter, generally an uncontrolled varying parameter; and may be implemented in a suitable profile generator or other control subsystem. In particular, a desired end state is specified by final values of a set of parameters, which include a first variable and first and second derivatives of the first variable with respect to a second (and, usually, uncontrolled) variable. The state change is defined in terms of parameters comprising the first variable, and the first and second derivatives of the first variable with respect to the second variable. Initial values of the second-derivative parameter are related to final values of the second-derivative parameter in terms of the defined state change, facilitating computation, based on the defined relationship, of a required initial value of the second-derivative parameter from the specified final value of the second-derivative parameter.

Mathematically, the required initial value of the second-derivative parameter may be given by $$\alpha_i'' = \frac{12\alpha_f - 6\theta(\alpha_i' - \alpha_f')}{\theta^2} + \alpha_f''$$

where $\alpha$ is the first variable, $\alpha_f$ is the specified final value of the first variable, $\theta$ is the second variable, $\alpha'$ is the first derivative of $\alpha$ with respect to $\theta$, $\alpha_i'$ is a specified initial value of $\alpha'$, $\alpha_f'$ is the specified final value of $\alpha'$, $\alpha''$ is the second derivative of $\alpha$ with respect to $\theta$, and $\alpha_f''$ is the specified final value of $\alpha''$.

In general, the controlled system may have a feedback element furnishing information concerning the component of the state that is being explicitly controlled, and the system may include several feedback elements for different, simultaneously controlled state components. Similarly, a profile generator implementing the principles of the invention may utilize multiple feedback signals to establish the current state.

It will therefore be seen that the foregoing represents a convenient and computationally efficient approach to profile generation that has applicability to numerous state-based systems. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of generating a state path for motion control, the path producing a desired end state specified by desired final values of position, velocity, and acceleration from an initial state, the method comprising the steps of:
   a. defining the motion in terms comprising position, velocity, and acceleration;
   b. relating an initial acceleration to the desired end state in terms of the defined motion; and
   c. computing, from the relationship, a required initial acceleration value to achieve the end state.

2. The method of claim 1 wherein an initial acceleration is related to final values of acceleration, velocity and position in terms of a time-related parameter, acceleration being a non-linear function of the time-related parameter, the computing step determining the required initial acceleration from the specified final values of position, velocity, acceleration, and the time-related parameter.

3. The method of claim 2 wherein the required initial acceleration is given by $$A_i = \frac{12P_f - 6t(V_i + V_f)}{t^2} + A_f$$

wherein $P_f$ is the specified final position relative to an initial position, $V_i$ is a specified initial velocity, $V_f$ is the specified final velocity, $A_f$ is the specified final acceleration, and t is time.

4. The method of claim 1 further comprising the steps of:
   d. receiving information specifying an actual position, velocity, and acceleration;
   e. computing therefrom the desired final position, velocity, and acceleration; and
   f. repeating steps (a)–(e) for a series of catenated final positions collectively defining a travel path.

5. A method of generating a state path culminating in a desired end state specified by final values of a set of parameters, the parameters including a first variable and first and second derivatives of the first variable with respect to a second variable, the second variable representing an uncontrolled varying parameter, the method comprising the steps of:
   a. defining the path in terms comprising the first variable, and the first and second derivatives of the first variable with respect to the second variable;
   b. relating initial values of the second derivative to final values of the second derivative in terms of the defined path; and
   c. computing, from the relationship, a required initial value of the second derivative from the specified final value of the second derivative.

6. The method of claim 5 wherein an initial value of the second derivative is further related to a final value of the first derivative and a final value of the first variable, the computing step determining the required initial value of the second derivative from the specified final values of the first variable, the first derivative, and the second derivative.

7. The method of claim 6 wherein the required initial value of the second derivative is given by $$\alpha_i'' = \frac{12\alpha_f - 6\theta(\alpha_i' - \alpha_f')}{\theta^2} + \alpha_f''$$

wherein $\alpha$ is the first variable, $\alpha_f$ is the specified final value of the first variable, $\theta$ is the second variable, $\alpha'$ is the first derivative of $\alpha$ with respect to $\theta$, $\alpha_i'$ is a specified initial value of $\alpha'$, $\alpha_f'$ is the specified final value of $\alpha'$, $\alpha''$ is the second derivative of $\alpha$ with respect to $\theta$, and $\alpha_f''$ is the specified final value of $\alpha''$.

8. A control system comprising:
   a. a controller for defining a desired motion;
   b. a profile generator for computing at least one state corresponding to at least a portion of the desired motion, the state being specified by desired final values of position, velocity, and acceleration relative to an initial state, the profile generator further computing, from the relationship, a required initial acceleration value from the specified final values of position, velocity, and acceleration; and
   c. means for executing the motion based on the required initial acceleration value.

9. The system of claim 8 wherein the means for executing the motion comprises:
   a. a variable-acceleration motor; and
   b. control means, responsive to the profile generator, for operating the motor in accordance with the computed initial acceleration value.

10. The system of claim 8 wherein an initial acceleration is related to final values of acceleration, velocity and position in terms of a time-related parameter, acceleration being a non-linear function of the time-related parameter, the profile generator determining the required initial acceleration from the specified final values of position, velocity, acceleration, and the time-related parameter.

11. The system of claim 10 wherein the required initial acceleration is given by $$A_i = \frac{12P_f - 6t(V_i + V_f)}{t^2} + A_f$$

wherein $P_f$ is the specified final position relative to an initial position, $V_i$ is a specified initial velocity, $V_f$ is the specified final velocity, $A_f$ is the specified final acceleration, and t is time.

12. The system of claim 8 wherein the profile generator is configured to:
   a. receive information specifying an actual position, velocity, and acceleration; and
   b. compute therefrom the desired final position, velocity, and acceleration to define a travel path.

* * * * *